United States Patent
Horesh et al.

(10) Patent No.: US 11,100,602 B2
(45) Date of Patent: Aug. 24, 2021

(54) SYSTEM AND METHOD FOR GEOMETRICAL USER INTERACTIONS VIA THREE-DIMENSIONAL MAPPING

(71) Applicant: R-Go Robotics LTD., Caesarea (IL)

(72) Inventors: Nizan Horesh, Caesarea (IL); Amir Bousani, Kadima (IL)

(73) Assignee: R-GO Robotics LTD., Caesarea (IL)

( * ) Notice: Subject to any disclaimer, the term of this patent is extended or adjusted under 35 U.S.C. 154(b) by 0 days.

(21) Appl. No.: 16/750,676

(22) Filed: Jan. 23, 2020

(65) Prior Publication Data
US 2020/0160479 A1 May 21, 2020

Related U.S. Application Data

(63) Continuation of application No. PCT/US2019/054499, filed on Oct. 3, 2019.
(Continued)

(51) Int. Cl.
*G06T 1/00* (2006.01)
*G06T 7/73* (2017.01)
(Continued)

(52) U.S. Cl.
CPC .......... *G06T 1/0014* (2013.01); *G06F 3/0488* (2013.01); *G06T 7/74* (2017.01);
(Continued)

(58) Field of Classification Search
CPC .......... G06T 1/0014; G06T 7/74; G06T 15/10; G06T 2200/04; G06T 2200/24; G06T 2207/30108; G06T 2215/16; G06F 3/0488
See application file for complete search history.

(56) References Cited

U.S. PATENT DOCUMENTS

2001/0037163 A1* 11/2001 Allard ................ B25J 9/1689
700/245
2013/0325244 A1* 12/2013 Wang ................ G06T 11/00
701/26
(Continued)

FOREIGN PATENT DOCUMENTS

WO 2015017691 A1 2/2015
WO 2018013538 A1 1/2018

OTHER PUBLICATIONS

The International Search Report and The Written Opinion of the International Searching Authority for PCT/US2019/054499, ISA/RU, Moscow, Russia.

*Primary Examiner* — Haixia Du
(74) *Attorney, Agent, or Firm* — M&B IP Analysts, LLC

(57) ABSTRACT

Systems and methods for providing geometric interactions via three-dimensional mapping. A method includes determining a plurality of first descriptors for a plurality of key points in a plurality of first images, wherein each first image shows a portion of a 3D environment in which a robotic device and a visual sensor are deployed; generating a 3D map of the 3D environment based on the plurality of key points and the plurality of descriptors; determining a pose of the visual sensor based on at least one second descriptor and the plurality of first descriptors, wherein the second image is captured by the visual sensor; and determining a target action location based on at least one user input made with respect to a display of the second image and the pose of the visual sensor, wherein the target action location is a location within the 3D environment.

27 Claims, 6 Drawing Sheets

Related U.S. Application Data

(60) Provisional application No. 62/742,565, filed on Oct. 8, 2018.

(51) Int. Cl.
  *G06F 3/0488* (2013.01)
  *G06T 15/10* (2011.01)

(52) U.S. Cl.
  CPC .......... *G06T 15/10* (2013.01); *G06T 2200/04* (2013.01); *G06T 2200/24* (2013.01); *G06T 2207/30108* (2013.01); *G06T 2215/16* (2013.01)

(56) References Cited

U.S. PATENT DOCUMENTS

| | | |
|---|---|---|
| 2015/0212521 A1 | 7/2015 | Pack et al. |
| 2017/0178355 A1 | 6/2017 | Alibay et al. |
| 2019/0206116 A1* | 7/2019 | Xu .......................... G06T 7/579 |

* cited by examiner

SYSTEM AND METHOD FOR GEOMETRICAL USER INTERACTIONS VIA THREE-DIMENSIONAL MAPPING

CROSS-REFERENCE TO RELATED APPLICATIONS

This application is a continuation of International Patent Application No. PCT/US2019/054499 filed on Oct. 3, 2019, now pending, which claims the benefit of U.S. Provisional Application No. 62/742,565 filed on Oct. 8, 2018, the contents of which are hereby incorporated by reference.

TECHNICAL FIELD

The present disclosure relates generally to interactions with robots using visual displays, and more particularly to providing visual information for use in robot control.

BACKGROUND

The robotics market has boomed since around 2016, resulting in a projection of billions of robots to be created in the years following. The use of robots has expanded in many areas including, for example, consumer, commercial, and industrial applications.

To aid in various functions, robots are often equipped with sensors for detecting features in their environments. Some of these sensors may aid in spatial awareness for the robot. For example, a camera may be used for visual recognition of objects in the surrounding environment.

Some robotic systems may be controlled (to varying degrees) by users. For example, drones (unmanned aerial vehicles typically equipped with sensors such as cameras) may be controlled remotely by users dictating drone movements. The user interfaces for such user-controlled robots may be unintuitive, particularly for users without significant experience in controlling similar systems. These interactions are further complicated when the controls include more than just movements. For example, a cleaning robot may require controlling the cleaning robot to move to the spot to be cleaned and then controlling the cleaning robot to actually perform cleaning actions. Also, these user interactions may be based on visual content (e.g., images or video) captured by the robots, but such visual content may be misleading. For example, objects may be closer or farther to the drone than they appear in the visual content.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing a geometrical user interface for a robotic device using three-dimensional (3D) mapping. The method comprises: determining a plurality of first descriptors for a plurality of key points in a plurality of first images, wherein each first image shows a portion of a 3D environment in which a robotic device is deployed, wherein each first image is captured by a visual sensor deployed with the robotic device; generating a 3D map of the 3D environment based on the plurality of key points and the plurality of descriptors, wherein the 3D map includes the plurality of key points and the plurality of first descriptors; determining a pose of the visual sensor based on at least one second descriptor and the plurality of first descriptors, wherein the at least one second descriptor is of a second image, wherein the second image shows a portion of the 3D environment, wherein the second image is captured by the visual sensor deployed with the robotic device; and determining a target action location based on at least one user input and the pose of the visual sensor, wherein the at least one user input is made with respect to a display of the second image, wherein the target action location is a location within the 3D environment.

Certain embodiments disclosed herein also include a robotic device. The robotic device comprises: a camera, wherein the camera is configured to capture a plurality of images, the plurality of images including a first plurality of images and a second image; a processing circuitry; and a memory, the memory containing instructions that, when executed by the processing circuitry, configure the processing circuitry to: determine a plurality of first descriptors for a plurality of key points in the plurality of first images; generate a 3D map of the 3D environment based on the plurality of key points and the plurality of descriptors, wherein the 3D map includes the plurality of key points and the plurality of first descriptors; determine a pose of the visual sensor based on at least one second descriptor and the plurality of first descriptors; and determine a target action location based on at least one user input and the pose of the visual sensor, wherein the at least one user input is made with respect to a display of the second image, wherein the target action location is a location within the 3D environment.

Certain embodiments disclosed herein also include a non-transitory computer readable medium having stored thereon causing a processing circuitry to execute a process, the process comprising: determining a plurality of first descriptors for a plurality of key points in a plurality of first images, wherein each first image shows a portion of a 3D environment in which a robotic device is deployed, wherein each first image is captured by a visual sensor deployed with the robotic device; generating a 3D map of the 3D environment based on the plurality of key points and the plurality of descriptors, wherein the 3D map includes the plurality of key points and the plurality of first descriptors; determining a pose of the visual sensor based on at least one second descriptor and the plurality of first descriptors, wherein the at least one second descriptor is of a second image, wherein the second image shows a portion of the 3D environment, wherein the second image is captured by the visual sensor deployed with the robotic device; and determining a target action location based on at least one user input and the pose of the visual sensor, wherein the at least one user input is made with respect to a display of the second image, wherein the target action location is a location within the 3D environment.

Certain embodiments disclosed herein also include a system for providing a geometrical user interface for a robotic device via three-dimensional (3D) mapping. The system comprises: a processing circuitry; and a memory, the memory containing instructions that, when executed by the processing circuitry, configure the system to: determine a plurality of first descriptors for a plurality of key points in a plurality of first images, wherein each first image shows a portion of a 3D environment in which a robotic device is deployed, wherein each first image is captured by a visual sensor deployed with the robotic device; generate a 3D map of the 3D environment based on the plurality of key points and the plurality of descriptors, wherein the 3D map includes the plurality of key points and the plurality of first descriptors; determine a pose of the visual sensor based on at least one second descriptor and the plurality of first descriptors, wherein the at least one second descriptor is of a second image, wherein the second image shows a portion of the 3D environment, wherein the second image is captured by the visual sensor deployed with the robotic device; and determine a target action location based on at least one user input and the pose of the visual sensor, wherein the at least one user input is made with respect to a display of the second image, wherein the target action location is a location within the 3D environment.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
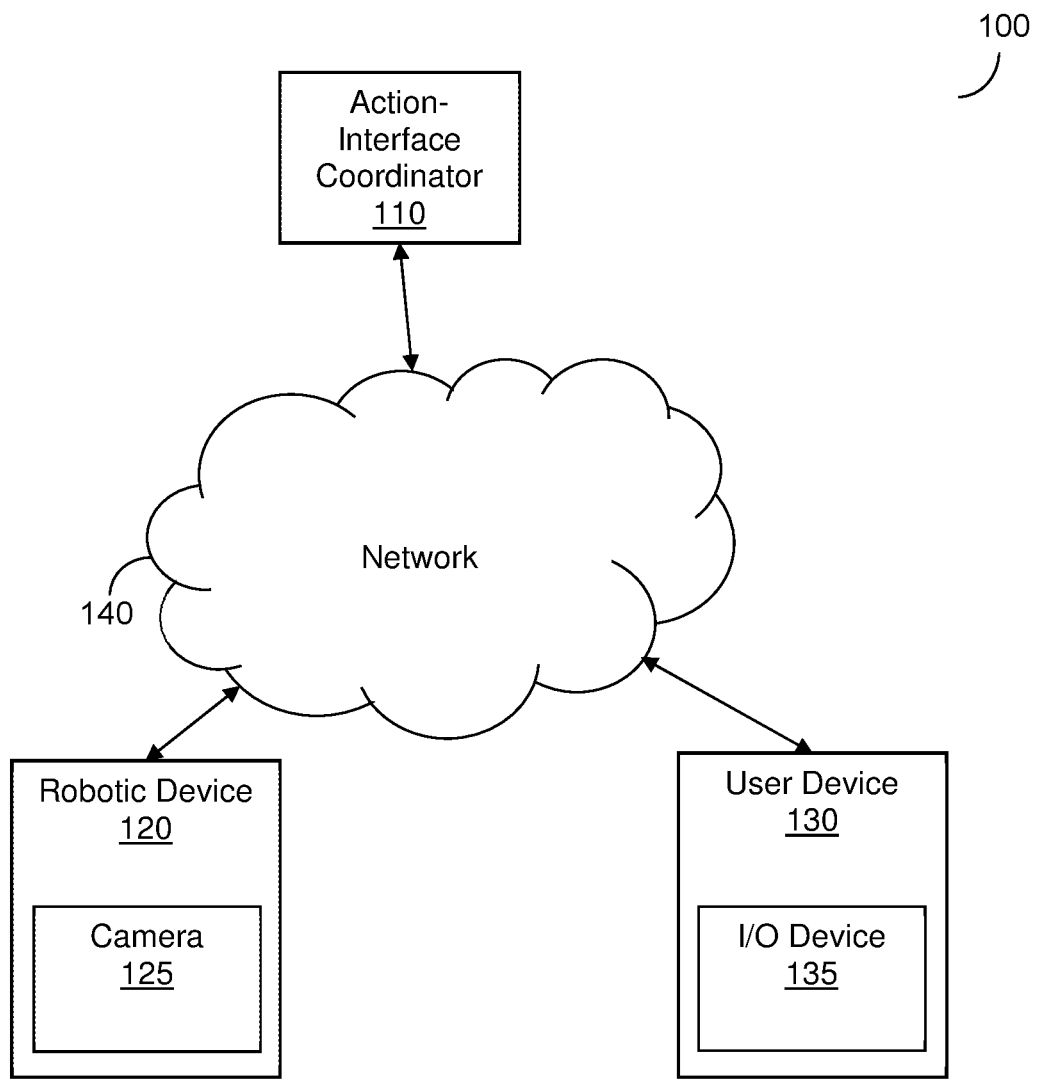
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing geometrical user interactions using three-dimensional mapping. The disclosed embodiments may be utilized to allow user interactions for the purpose of directing or otherwise controlling a robot or other system including or near a camera. Key points are detected in mapping images showing portions of a scene. The scene is a three-dimensional environment shown at least partially in the mapping images. Each key point is salient, i.e., a location in an image that is distinguishable from other locations within spatial vicinity of the location of the key point in the image. One or more descriptors is determined for each key point. The descriptors may be utilized by a similarity function to measure a visual similarity between two key points.

Based on the key points and the associated descriptors, three-dimensional (3D) coordinates of each key point within the scene are determined. In an embodiment, determining the 3D coordinates of each key point includes determining associations among the key points in different images. Determining the associations include identifying key points corresponding to the same object shown in multiple images. In another embodiment, a 3D structure of the scene may be determined independently of the key points (e.g., by using depth cameras, LIDAR, etc.), and each key point may be associated with a 3D coordinate of the determined 3D structure of the scene by interpolating the 3D location within the 3D structure based on a two-dimensional location of the key point as shown in the image.

The determined 3D coordinates of key points in the scene and their associated descriptors are utilized to compose a 3D map of the scene. In some implementations, the key points may be organized with respect to their respective descriptors in a manner to improve search efficiency such as, for example, a bag-of-words model.

When the 3D map of the scene has been created, descriptors are determined for a new image and the determined descriptors for the new image are matched to descriptors associated with key points of the 3D map. Based on the matched descriptors, a current pose of the camera capturing the new images in the scene is determined for the new image. In some implementations, a 3D estimation of key points in the new image may be determined and may be matched to locations of the 3D map using 3D-to-3D point correspondence. The current pose includes a position and an orientation of the camera.

The new image is presented to a user, for example as a live feed, and the user may interact with a user interface in order to provide user inputs indicating a desired action of a system such as, but not limited to, a robot, with respect to the images. As a non-limiting example, an image may be presented to the user via a graphical user interface, and the user may select a portion of the image which corresponds to a real-world location that the user would like a robot to move to. In another example, the user may mark a trajectory they would like the robot to follow. In yet another example, the user may mark a region they would like the robot to cover or alternatively, not to cover (i.e., a "no go" zone).

The disclosed embodiments allow for various use cases in which a user directs a robot or other real-world action-performing system to move to a location in the 3D environment in order to perform one or more actions or to avoid performing actions in that location. As a first use case, for a floor cleaner robot, the user inputs may mark a location where they would like the robot to clean or may mark a location where they would like the robot not to clean (i.e., a "no go" zone). As a second use case, for a lawn mowing robot, the user inputs may mark locations where they would like the lawnmower to mow in or no go zones where the robot should not mow in. As a third use case, for a warehouse logistics robot, the user inputs may mark a location or an object to be picked up, or may mark a no go zone where the robot should not go.

The disclosed embodiments allow for identifying poses of a camera capturing images based on image features shown in the images. Accordingly, the disclosed embodiments allow for determining a route for moving to specific objects shown in the images. Routes determined according to the disclosed embodiments may be used to relocate the system including the camera based on inputs related to the images such as user inputs indicating directions or objects shown in the images to which the camera should be relocated. The poses of the camera and, accordingly, the routes determined as described herein may be more accurate than, for example, poses and routes determined based solely on 2D images without any 3D mapping.

FIG. 1 shows an example network diagram 100 utilized to describe the various disclosed embodiments. The network diagram 100 includes an action-interface coordinator 110, a robotic device 120, and a user device 130 communicating via a network 140. The network 140 may be, but is not limited to, a wireless, cellular or wired network, a local area network (LAN), a wide area network (WAN), a metro area network (MAN), the Internet, the worldwide web (WWW), similar networks, and any combination thereof.

The robotic device 120 is a real-world action performing system configured to perform actions at a real-world location such as a robot. In particular, the robotic device 120 is at least configured to perform various functions described herein such as, but not limited to, mapping a scene, navigating within the scene, and acting within the scene. Example actions that the robotic device 120 may be configured to perform within the scene may include, but are not limited to, cleaning (e.g., vacuuming), lawncare (e.g., mowing), logistics (e.g., picking up and dropping off items), and the like.

During execution of various disclosed embodiments, the robotic device 120 is moved within a scene. In an example implementation, the robotic device 120 is a robot configured for locomotion from one real-world location to another. As a non-limiting example, the robotic device 120 may be a drone adapted for navigation via flight. The robotic device 120 is further configured to receive action instruction data from the action-interface coordinator 110 and to perform actions at the scene based on the action instruction data.

The robotic device 120 is deployed with a visual sensor such as a camera 125 configured to capture visual content such as images, video, and the like. The camera 125 is deployed with the robotic device 120 by, for example, by being included in the robotic device 120, being mounted on or otherwise affixed to the robotic device 120, or otherwise being deployed in proximity to the robotic device 120 such that the camera 125 occupies approximately the same location within the 3D environment as the robotic device 120. As a result, images captured by the camera 125 effectively show views from the perspective of the robotic device 120.

The user device 130 may be, but is not limited to, a personal computer, a laptop, a tablet computer, a smartphone, a wearable computing device, or any other device capable of receiving and displaying images as well as receiving and sending user inputs. To this end, the user device 130 includes an input/output (I/O) device 135 configured to receive user inputs. The I/O device 135 may be, but is not limited to, a touch screen, a mouse, a keyboard, a joystick, a combination thereof, and the like. The user device 130 is configured to receive images captured by the camera 125, to display the received images, and to receive inputs via the I/O device 135 with respect to the displayed images.

The action-interface coordinator 110 is configured to create a 3D map of a scene as described herein. The scene is a 3D environment in which the robotic device 120 and the camera 125 are deployed and in which the robotic device 120 performs actions. The 3D map represents objects in the scene as shown in images captured by the camera 125 and includes key points identified in the images as well as descriptors of the key points. The action-interface coordinator 110 is further configured to determine target action locations on the 3D map to which the robotic device 120 should navigate or perform other actions and to send, to the robotic device 120, instructions for performing actions at the target action locations.

It should be noted that the embodiments described herein with respect to FIG. 1 are discussed with respect to the camera 125 integrated in the robotic device 120 and the action-interface coordinator 110 not being integrated in the robotic device 120 merely for simplicity purposes and without limitation on the disclosed embodiments. In other words, the camera may be affixed to or otherwise deployed near the robotic device 120 such that the position of the camera 125 is approximately the same as that of the robotic device 120 without departing from the scope of the disclosed embodiments. The action-interface coordinator 110 may be integrated in or otherwise connected to the robotic device 120 such that communications between the action-interface coordinator 110 and other systems of the robotic device 120 are not conducted over a network without departing from the scope of the disclosed embodiments.

Figure 2:
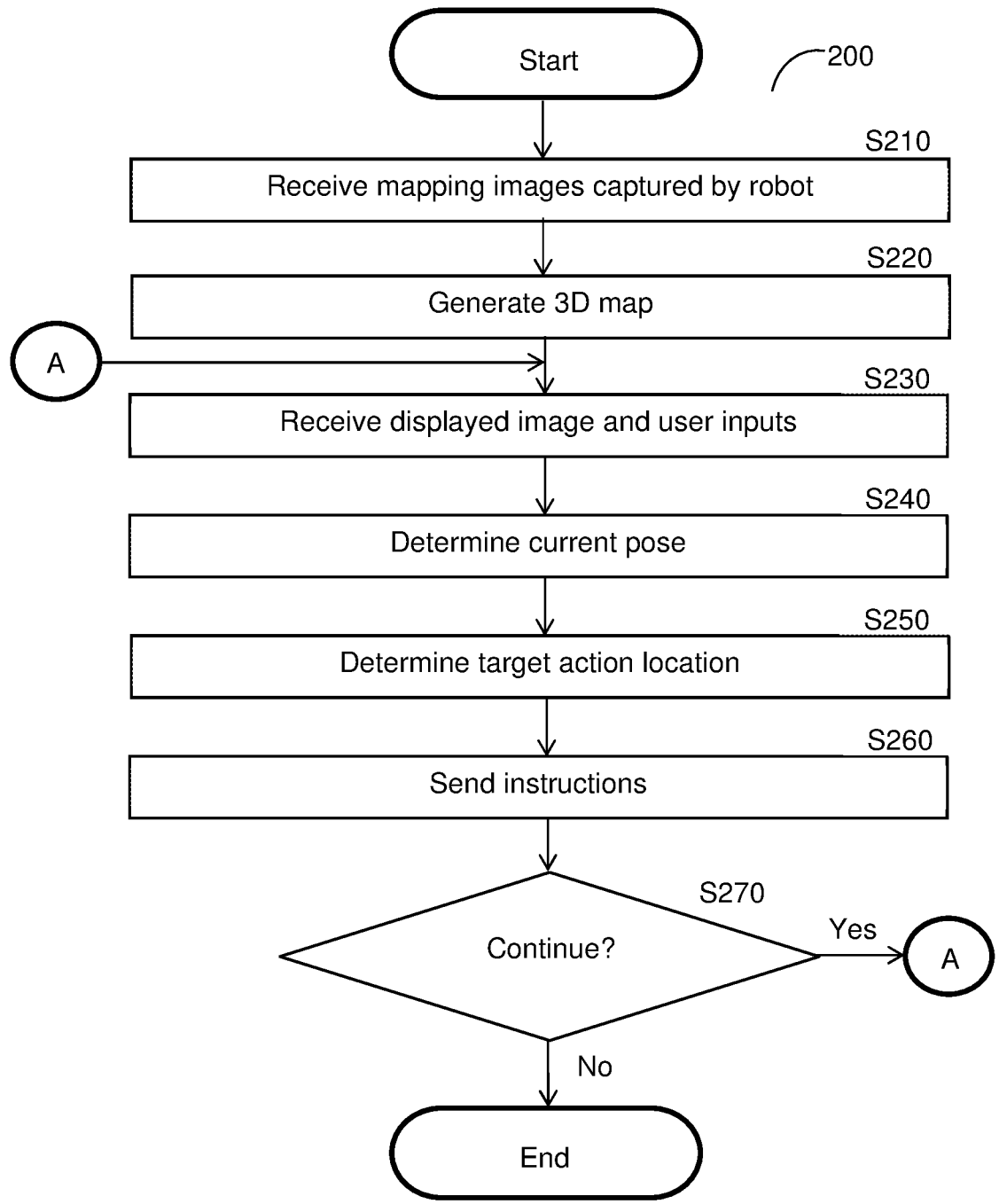
FIG. 2 is a flowchart illustrating a method for providing geometrical user interactions via three-dimensional mapping according to an embodiment.

FIG. 2 is an example flowchart 200 illustrating a method for providing geometrical user interactions via three-dimensional mapping according to an embodiment.

At S210, a set of first mapping images captured by a camera of a system (e.g., the robotic device 120, FIG. 1) deployed in a scene is received. The mapping images are utilized to map the scene. In an embodiment, S210 may include correcting the mapping images to eliminate geometric distortions and photometric distortions (e.g., lens shading).

At S220, a three-dimensional (3D) map of the scene is generated based on the received mapping images. To this end, S220 includes detecting key points in each of the mapping images and determining associated descriptors for the detected key points as described further herein below with respect to FIG. 3. In an embodiment, the 3D structure of the scene is determined based on appearances of one or more of the key points in multiple images. In an embodiment, the key points are selected such that they have high recall (i.e., such that the same key point may be identified in different images despite changes in perspective and illumination among images), high precision (i.e., such that only sufficiently distinguishable key points are detected), or both.

The 3D map may be created using Structure from Motion (SfM) to compute 3D coordinates of the key points in the mapping images. The results of the SfM are a batch estimation of the 3D structure of the scene. Alternatively, simultaneous localization and mapping (SLAM) may be utilized for online estimation of the 3D structure of the scene. In another implementation, the SfM or SLAM estimation can be achieved using a combination of sensors such as, but not limited to, an inertial measurement unit (IMU) and wheel encoders.

In another embodiment, the 3D structure of the scene may be determined using another method such as, but not limited to, using a depth camera to determine 3D features of the scene or an image-based method that does not utilized key points as described herein. Coordinates of the 3D structure determined using such a method may be associated with key points detected in the image by interpolating the 3D structure as seen from the perspective of each mapping image at the 2D location of its respective key points.

At S230, a second displayed image and user inputs are received. The user inputs are based on user interactions with respect to the displayed image as displayed via a user device and may be, for example, a click, a touch on a touchscreen, a drag, a press of a button (e.g., an arrow key), interaction with a joystick, other gestures, and the like.

The displayed image, like the mapping images, is also captured by the camera of the system. The displayed image shows the scene essentially from the perspective of the system at the time of capture of the displayed image. It should be noted that the displayed image may not be displayed on the user device and, instead, may be displayed via any display in communication with the user device without departing from the scope of the disclosed embodiments. For example, the user device may send the image to be displayed to an external display device and may receive the user inputs.

At S240, a current pose of the camera that captured the displayed image is determined based on the displayed image. Since the camera is deployed with the robotic device as described above, the pose of the camera is approximately the same as the pose of the system deployed with the camera. A location of the current pose is among the 3D coordinates included in the generated 3D map. In an embodiment, S240 includes detecting key points in the displayed image and determining descriptors for one or more key points in the displayed image, for example as described further herein below with respect to steps S310 and S320 of FIG. 3. The descriptors determined for the displayed image are compared to the descriptors of key points in the 3D map to identify matching descriptors in the 3D map and, accordingly, to determine a pose of the camera with respect to the 3D map (i.e., an estimated position of the camera within the 3D map and an estimated orientation of the camera with respect to key points of the 3D map.

The current pose is determined with respect to the locations of the 3D map identified in the displayed image. Specifically, given the matched descriptors, a geometrical transformation may be determined between the key points in the 2D displayed images and the key points of the 3D map using 3D pose estimation with 2D to 3D point correspondence. Alternatively, a 3D estimation of the key points in the displayed images may be determined using SfM or SLAM followed by 3D-to-3D point correspondence. In yet another implementation, orientation information as measured from an inertial measurements unit (IMU and a digital compass to search for 3D poses with suitable orientations in comparison to the displayed images. Based on the determined geometric transformation, a current pose of the camera with respect to the 3D map may be determined.

At S250, a target action location is determined based on the user inputs with respect to the displayed image. The target action location is a location to which the system deployed with the camera should move, at which the system deployed with the camera should perform one or more real-world actions, or both. As a non-limiting example, a user may tap a touchscreen displaying the second image, thereby indicating that the target navigation location is to be a location represented by the tapped portion of the touchscreen. As another non-limiting example, a user may click, using a mouse, a portion of the second image as displayed on a user device to be selected as the target navigation location. As yet another example, the user may drag their finger along the touchscreen to select a line or curve on the screen, thereby indicating a target navigation location and a potential route. As yet another example, the user may drag their finger along the touchscreen to select a region or region boundary in order to mark an area to be covered by the robot operation, or alternatively to define a "no-go" region. In some implementations, the interaction may not involve interacting with the display. For example, a user may utilize a pointing device (e.g., a light gun, a laser pointer, etc.) to indicate a direction for moving to the navigation location without touching or otherwise interacting with the image displayed on a screen.

Figure 5A:
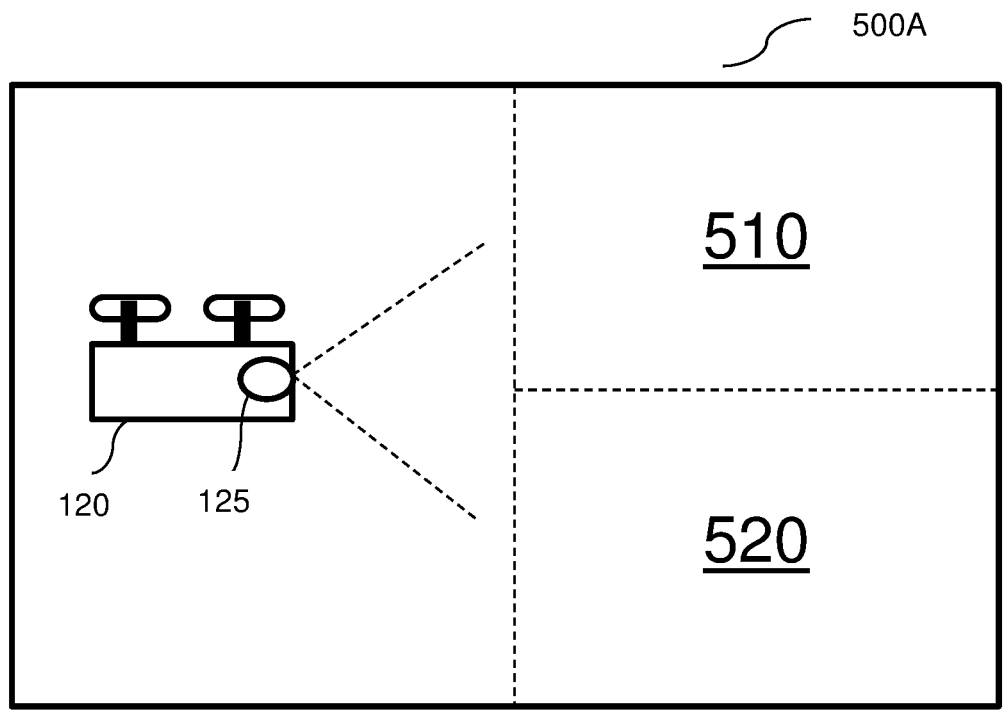
FIGS. 5A-B are example diagrams illustrating a robotic device deployed in a scene.
Figure 5B:
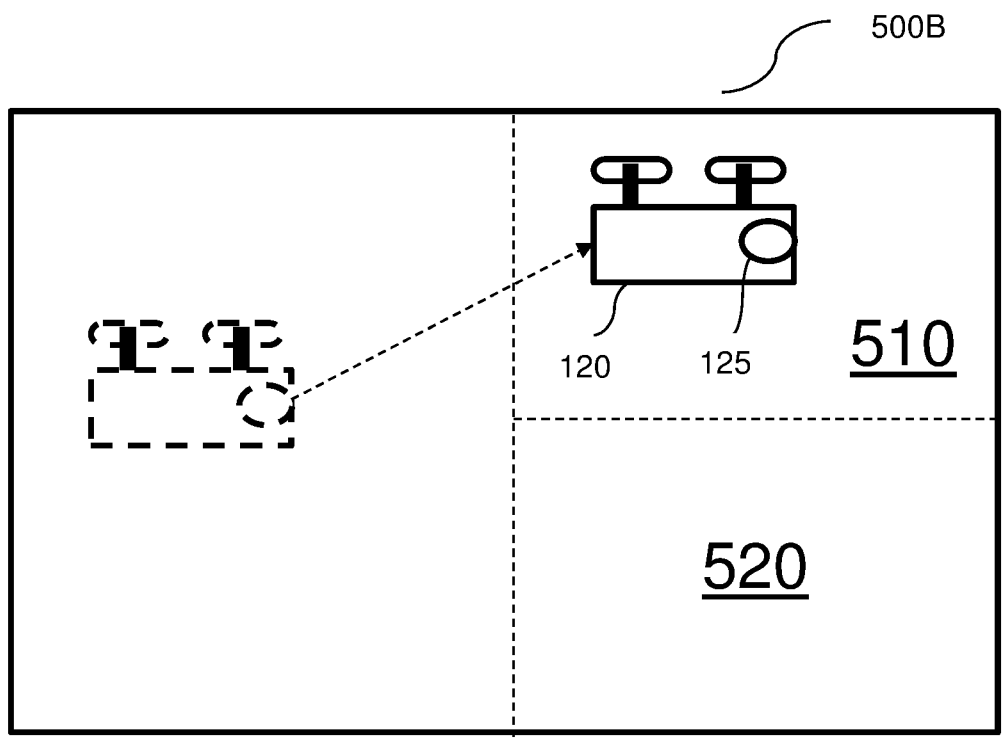
Figure 6:
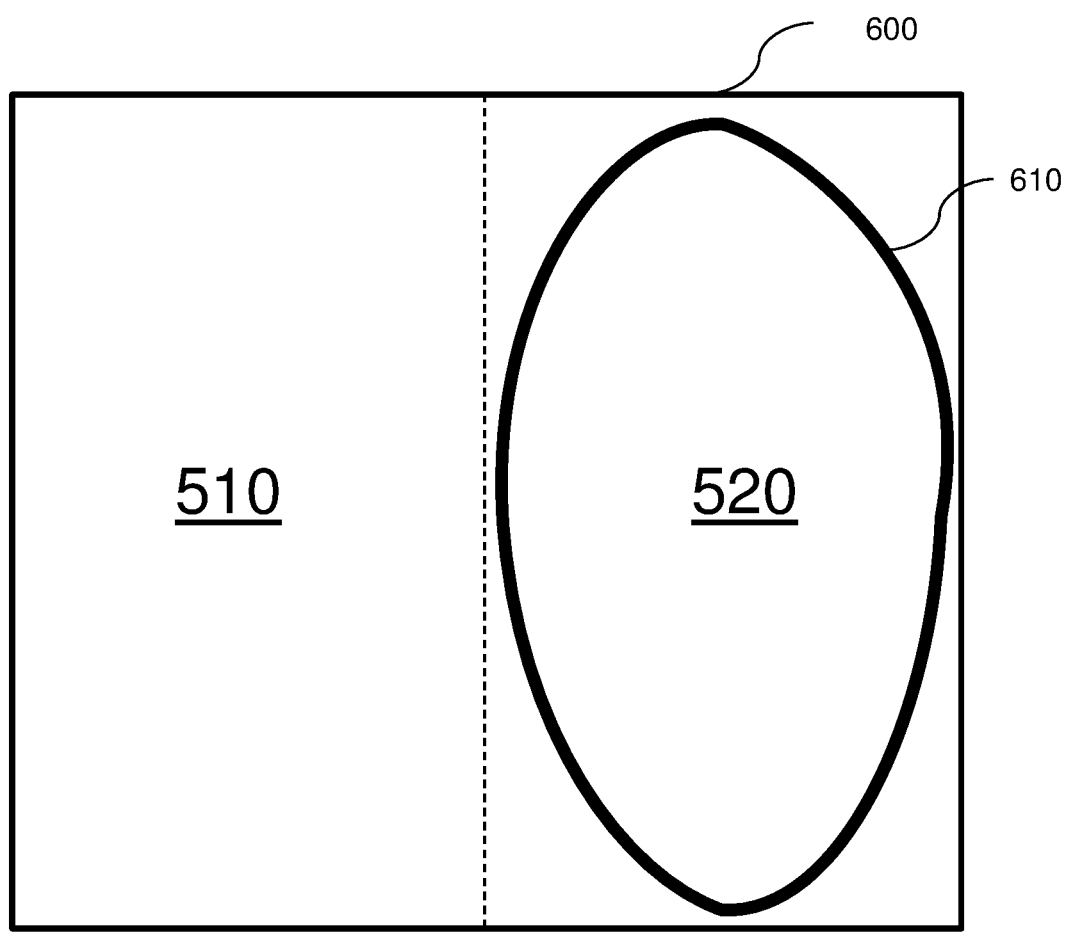
FIG. 6 is an example diagram of an image displayed to a user marked based on user inputs.

FIGS. 5A-B and 6 are example diagrams utilized to illustrate defining of a "no-go" region in accordance with various disclosed embodiments. In FIG. 5A, the robotic device 120 is a drone including the camera 125 taking pictures of a 3D environment in which the drone flies. The robotic device 120, via the camera 125, captures images of portions of the 3D environment 510 and 520.

FIG. 6 shows an example diagram 600 showing a display of an image captured by the robotic device 120 deployed as shown in FIG. 5A. The example diagram 600 illustrates an example display which may be shown on a user device. The user interacts with the display using one or more user interfaces (e.g., a graphical user interface). As a non-limiting example, the image is shown on a computer having a touchscreen and the user interacts with the image via the touchscreen.

As shown in FIG. 6, the user has marked an area 610 shown in the image by moving their finger on the touchscreen. The area 610 is visually depicted for sake of illustration. In the example implementation shown in FIGS. 5A-B, the markings 610 are utilized to mark a "no-go" area, in this case, the area 520. Thus, as shown in FIG. 5B, the robotic device 120 does not move into the "no-go" zone of area 520.

In an embodiment, the user inputs used for determining the target action location define a 3D ray within the space represented by the displayed image. To this end, the user inputs may indicate a point, line, curve, and the like. For a point, a single point in the 2D image may correspond to a 3D ray. A line or curve may correspond to multiple 3D rays. The target action location may be determined by intersecting the 3D ray indicated by the user with the 3D structure of the scene. The point at which the 3D ray intersects with the scene geometry is determined as the target action location.

At S260, instructions are sent to the system. The instructions are for performing one or more actions with respect to the target action location and may include these locations, a proposed route for navigating from one location to the other, instructions for specific movements along the proposed route (e.g., ascend, descend, move left, move right, move forward, move backward, etc.), instructions for other actions to be performed at the target action location (e.g., picking up an object, dropping an object, capturing images of an object, etc.), a combination thereof, and the like.

At S270, it is determined whether execution should continue and, if so, execution continues with S230 where additional user inputs are received with respect to a new displayed image displayed via the user device; otherwise, execution terminates.

Figure 3:
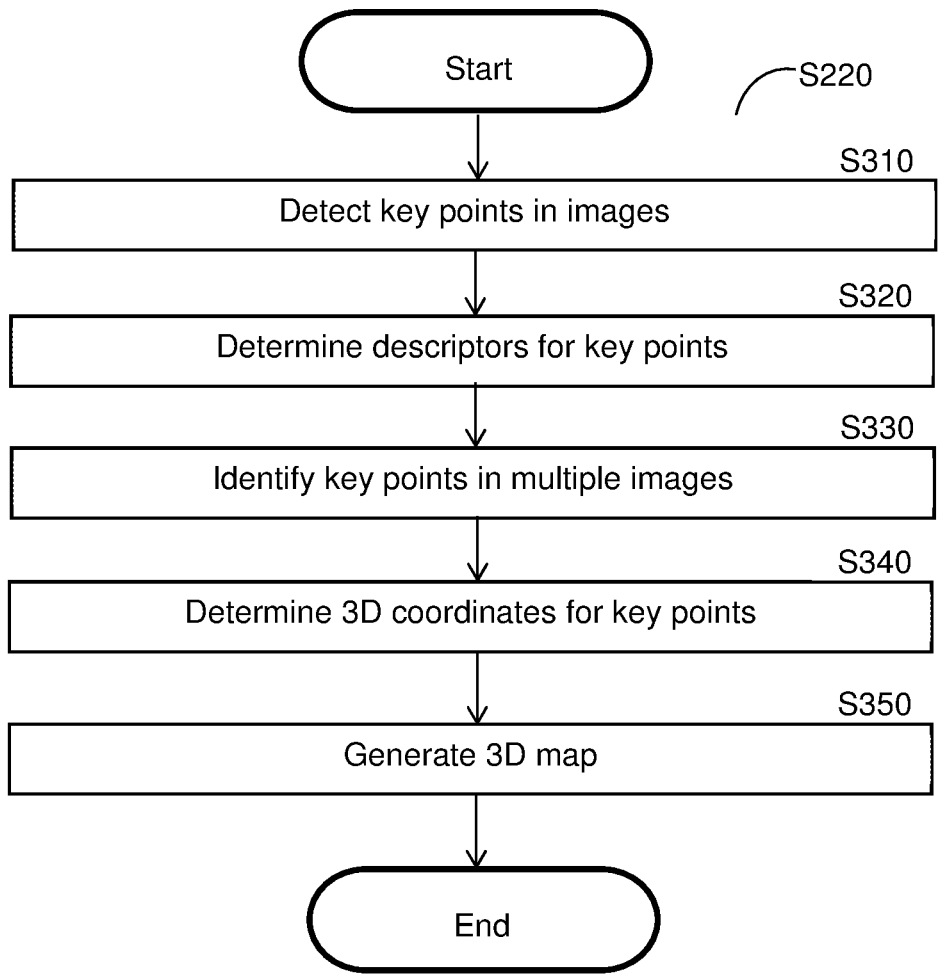
FIG. 3 is a flowchart illustrating a method for identifying locations in a three-dimensional environment based on images captured by a robot according to an embodiment.

FIG. 3 is an example flowchart S220 illustrating a method for identifying locations in a three-dimensional environment based on images captured by a robot according to an embodiment. In an embodiment, the method is performed with respect to the mapping images received at S210, FIG. 2.

At S310, key points in the images are detected. Each key point is salient such that it is noticeable and distinguishable from other points of the image. To this end, S310 may include using a method for finding key points in an image such as, but not limited to, applying a Harris Corner Detector operator, applying a Shi-Tomasi Corner Detector operator, detecting scale-space extrema, and approximation using Differences-of-Gaussians (DOG). In an embodiment, the key point detection is configured for high recall and high precision with respect to identifying key points that are likely to be sufficient. Specifically, in an example implementation, a threshold area under a Receiver Operating Characteristic (ROC) curve may be utilized to determine whether the recall and precision are sufficient. In another example implementation, the recall or the precision may be fixed and the other value may be compared to a threshold to determine if the recall and precision are suitable.

At S320, descriptors are determined for each detected key point. Each descriptor is determined based on the respective image and the corresponding key point. Each descriptor is one or more values (e.g., a set of numbers such as real numbers, integer numbers binary numbers, etc.) that collectively describe image information around the corresponding key point and is associated with its corresponding key point.

In an embodiment, each descriptor can be used by a similarity function to allow for determining whether two descriptors likely represent the same key point. In an embodiment, each descriptor and its associated measure are invariant to image transformations such as pixel noise, perspective changes, and illumination changes. The descriptors that may be utilized may include, but are not limited to, a scale-invariant feature transform (SIFT), speeded-up robust features (SURF), binary robust independent elementary features (BRIEF), and oriented fast and rotated brief (ORB).

At S330, appearances of the key points in at least two of the images are identified. Specifically, each key point appearing in multiple images is identified as such. By identifying key points in multiple images, locations of those key points relative to each other may be determined. Accordingly, this identification allows for creating an internally consistent map of the key points and, therefore, the scene including the key points.

At S340, 3D coordinates of the key points are determined based on the key points and the identified appearances of one or more of the key points in multiple images. Determining the 3D coordinates may include performing Structure from Motion (SfM) to estimate a 3D structure of the scene based on the 2D images of the scene.

At S350, a 3D map is generated based on the 3D coordinates. The 3D map is composed of the 3D coordinates of the key points and their associated descriptors. In some implementations, the key points may also be organized in an additional data structure to allow for improved search efficiency. For example, a bag of words data structure may include the key points organized based on their descriptors.

Figure 4:
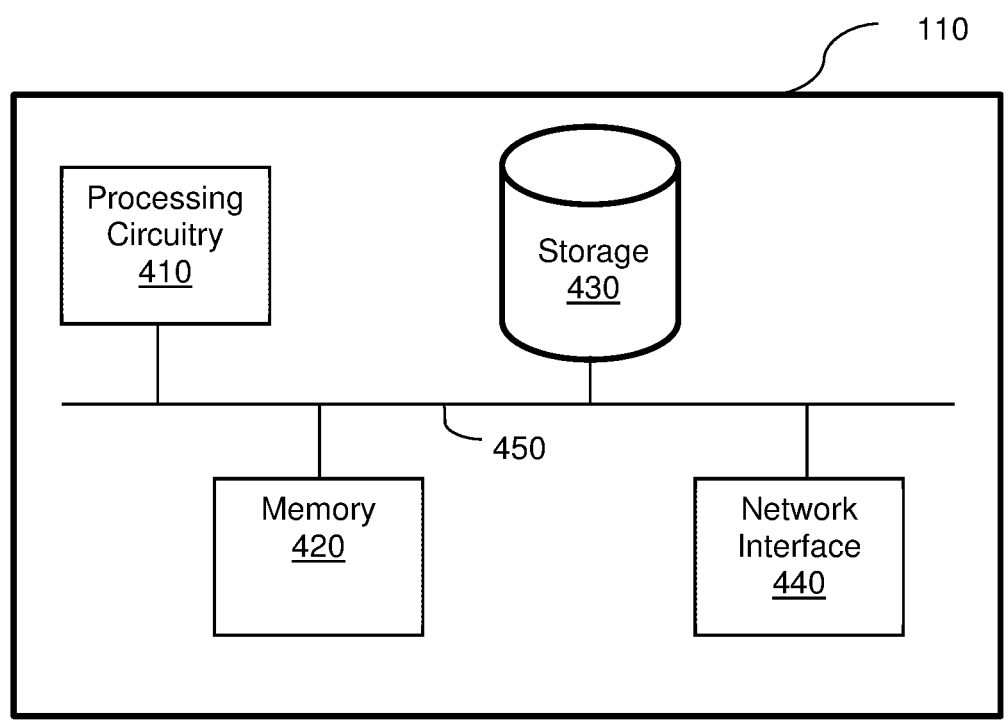
FIG. 4 is a schematic diagram of a key point locator according to an embodiment.

FIG. 4 is an example schematic diagram of the action-interface coordinator 110 according to an embodiment. The action-interface coordinator 110 includes a processing circuitry 410 coupled to a memory 420, a storage 430, and a network interface 440. In another embodiment, the components of the action-interface coordinator 110 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 240 to perform the various processes described herein. Specifically, the instructions, when executed, cause the processing circuitry 410 to perform an on-demand authorization of access to protected resources, as discussed hereinabove.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the action-interface coordinator 110 to communicate with the user device 120, the robot 130, or a combination of, for the purpose of, for example, receiving visual content and user inputs, sending images for display, and the like.

It should be understood that the embodiments described herein are not limited to the specific architecture illustrated in FIG. 4, and other architectures may be equally used without departing from the scope of the disclosed embodiments.

It should be noted that various embodiments have been described with respect to a robot including a camera merely for simplicity purposes. Visual content may be created based on images captured by any system to allow for user interactions indicating desired actions by the system based on the position of the system within the scene without departing from the scope of the disclosure. Other visual sensors, incorporated in a system or deployed near the system such that the pose of the visual sensors can be correlated with the pose of the system, may be equally utilized without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing a geometrical user interface for a robotic device using three-dimensional (3D) mapping, comprising:
    determining a plurality of first descriptors for a plurality of key points in a plurality of first images, wherein each first image shows a portion of a 3D environment in which a robotic device is deployed, wherein each first image is captured by a first visual sensor deployed with the robotic device;
    generating a 3D map of the 3D environment based on the plurality of key points and the plurality of first descriptors, wherein the 3D map includes the plurality of key points and the plurality of first descriptors;
    determining a pose of a second visual sensor of a user device deployed in the 3D environment based on at least one second descriptor and the plurality of first descriptors, wherein the at least one second descriptor is of a second image, wherein the second image shows a portion of the 3D environment, wherein the second image is captured by the second visual sensor, wherein the pose of the second visual sensor includes a position and an orientation of the second visual sensor, wherein a location of the pose of the second visual sensor is among coordinates of the generated 3D map; and
    determining a target action location based on at least one user input and the pose of the second visual sensor, wherein the at least one user input is made with respect to a display of the second image on the user device, wherein the target action location is a location within the 3D environment.

2. The method of claim 1, further comprising:
    sending instructions for performing at least one action to the robotic device.

3. The method of claim 2, wherein the sent instructions include instructions for causing the robotic device to navigate to the target action location via a route, wherein the route is determined based on the target action location and the 3D map.

4. The method of claim 1, wherein each of the plurality of key points is a respective first location within one of the plurality of first images that is distinguishable from each of a plurality of second locations.

5. The method of claim 1, wherein the plurality of first images includes a plurality of frames, wherein generating the 3D map further comprises:
    determining 3D coordinates of the plurality of key points based on associations among the plurality of key points as shown in different images of the plurality of first images.

6. The method of claim 5, wherein each key point corresponds to an object in the 3D environment, wherein determining the 3D coordinates further comprises:
    identifying at least one key point of the plurality of key points that appears in at least two of the plurality of first images, wherein the associations among the plurality of key points are determined based on the identified at least one key point.

7. The method of claim 1, wherein determining the pose of the visual sensor further comprises:
    matching the at least one second descriptor to at least one of the plurality of first descriptors.

8. The method of claim 1, wherein the at least one user input defines a 3D ray, wherein determining the target action location further comprises:
    determining a point at which the 3D ray intersects with a 3D structure of the scene, wherein the target action location is the point at which the 3D ray intersects with the 3D structure of the scene.

9. The method of claim 1, wherein the plurality of key points is detected in one of the plurality of first images by utilizing a threshold area under a Receiver Operating Characteristic curve, wherein the plurality of key points has recall and precision above a threshold.

10. The method of claim 1, wherein the robotic device is configured to perform at least one function, wherein the robot device performs at least one of the at least one function at the target action location.

11. The method of claim 10, wherein the at least one function includes any of: cleaning, mowing a lawn, and picking up an object.

12. The method of claim 1, wherein the robotic device is configured to perform at least one function, wherein the robotic device does not perform the at least one function in the target action location.

13. A robotic device, comprising:
    a camera, wherein the camera is configured to capture a plurality of images, the plurality of images including a plurality of first images;
    a processing circuitry; and
    a memory, the memory containing instructions that, when executed by the processing circuitry, configure the processing circuitry to:
    determine a plurality of first descriptors for a plurality of key points in the plurality of first images;
    generate a 3D map of the 3D environment based on the plurality of key points and the plurality of first descriptors, wherein the 3D map includes the plurality of key points and the plurality of first descriptors;

determine a pose of a visual sensor of a user device deployed in the 3D environment based on at least one second descriptor of a second image captured by the visual sensor of the user device and the plurality of first descriptors, wherein the pose of the visual sensor includes a position and an orientation of the visual sensor, wherein a location of the pose of the visual sensor is among coordinates of the generated 3D map; and determine a target action location based on at least one user input and the pose of the visual sensor of the user device, wherein the at least one user input is made with respect to a display of the second image on the user device, wherein the target action location is a location within the 3D environment.

14. The robotic device of claim 13, wherein the robotic device is any one of: a robotic lawn mower, a cleaning robot, and a logistics robot.

15. A non-transitory computer readable medium having stored thereon instructions for causing a processing circuitry to execute a process, the process comprising:

determining a plurality of first descriptors for a plurality of key points in a plurality of first images, wherein each first image shows a portion of a 3D environment in which a robotic device is deployed, wherein each first image is captured by a visual sensor deployed with the robotic device;

generating a 3D map of the 3D environment based on the plurality of key points and the plurality of first descriptors, wherein the 3D map includes the plurality of key points and the plurality of first descriptors;

determining a pose of a second visual sensor of a user device deployed in the 3D environment based on at least one second descriptor and the plurality of first descriptors, wherein the at least one second descriptor is of a second image, wherein the second image shows a portion of the 3D environment, wherein the second image is captured by the second visual sensor, wherein the pose of the second visual sensor includes a position and an orientation of the second visual sensor, wherein a location of the pose of the second visual sensor is among coordinates of the generated 3D map; and determining a target action location based on at least one user input and the pose of the second visual sensor, wherein the at least one user input is made with respect to a display of the second image on the user device, wherein the target action location is a location within the 3D environment.

16. A system for providing a geometrical user interface for a robotic device via three-dimensional (3D) mapping, comprising:

a processing circuitry; and a memory, the memory containing instructions that, when executed by the processing circuitry, configure the system to:

determine a plurality of first descriptors for a plurality of key points in a plurality of first images, wherein each first image shows a portion of a 3D environment in which a robotic device is deployed, wherein each first image is captured by a visual sensor deployed with the robotic device;

generate a 3D map of the 3D environment based on the plurality of key points and the plurality of first descriptors, wherein the 3D map includes the plurality of key points and the plurality of first descriptors;

determine a pose of a second visual sensor of a user device deployed in the 3D environment based on at least one second descriptor and the plurality of first descriptors, wherein the at least one second descriptor is of a second image, wherein the second image shows a portion of the 3D environment, wherein the second image is captured by the second visual sensor, wherein the pose of the second visual sensor includes a position and an orientation of the second visual sensor, wherein a location of the pose of the second visual sensor is among coordinates of the generated 3D map; and determine a target action location based on at least one user input and the pose of the second visual sensor, wherein the at least one user input is made with respect to a display of the second image on the user device, wherein the target action location is a location within the 3D environment.

17. The system of claim 16, wherein the system is further configured to:

send instructions for performing at least one action to the robotic device.

18. The system of claim 17, wherein the sent instructions include instructions for causing the robotic device to navigate to the target action location via a route, wherein the route is determined based on the target action location and the 3D map.

19. The system of claim 16, wherein each of the plurality of key points is a respective first location within one of the plurality of first images that is distinguishable from each of a plurality of second locations.

20. The system of claim 16, wherein the plurality of first images includes a plurality of frames, wherein the system is further configured to:

determine 3D coordinates of the plurality of key points based on associations among the plurality of key points as shown in different images of the plurality of first images.

21. The system of claim 20, wherein each key point corresponds to an object in the 3D environment, wherein the system is further configured to:

identify at least one key point of the plurality of key points that appears in at least two of the plurality of first images, wherein the associations among the plurality of key points are determined based on the identified at least one key point.

22. The system of claim 16, wherein the system is further configured to:

match the at least one second descriptor to at least one of the plurality of first descriptors.

23. The system of claim 16, wherein the at least one user input defines a 3D ray, wherein the system is further configured to:

determine a point at which the 3D ray intersects with a 3D structure of the scene, wherein the target action location is the point at which the 3D ray intersects with the 3D structure of the scene.

24. The system of claim 16, wherein the plurality of key points is detected in one of the plurality of first images by utilizing a threshold area under a Receiver Operating Characteristic curve, wherein the plurality of key points has recall and precision above a threshold.

25. The system of claim 16, wherein the robotic device is configured to perform at least one function, wherein the robot device performs at least one of the at least one function at the target action location.

26. The system of claim 25, wherein the at least one function includes any of: cleaning, mowing a lawn, and picking up an object.

27. The system of claim 16, wherein the robotic device is configured to perform at least one function, wherein the robotic device does not perform the at least one function in the target action location.

\* \* \* \* \*